US011831551B2

(12) United States Patent
Zhang et al.

(10) Patent No.: US 11,831,551 B2
(45) Date of Patent: Nov. 28, 2023

(54) CLOUD COMPUTING DATA CENTER SYSTEM, GATEWAY, SERVER, AND PACKET PROCESSING METHOD

(71) Applicant: HUAWEI CLOUD COMPUTING TECHNOLOGIES CO., LTD., Gui'an New District (CN)

(72) Inventors: Zhengxian Zhang, Shenzhen (CN); Fuzhou Liu, Shenzhen (CN); Bo Yao, Hangzhou (CN)

(73) Assignee: HUAWEI CLOUD COMPUTING TECHNOLOGIES CO., LTD., Gui'an New Distrcit (CN)

( * ) Notice: Subject to any disclaimer, the term of this patent is extended or adjusted under 35 U.S.C. 154(b) by 238 days.

(21) Appl. No.: 17/358,264

(22) Filed: Jun. 25, 2021

(65) Prior Publication Data

US 2021/0320872 A1    Oct. 14, 2021

Related U.S. Application Data

(63) Continuation of application No. PCT/CN2019/128497, filed on Dec. 26, 2019.

(30) Foreign Application Priority Data

Dec. 26, 2018  (CN) .......................... 201811602177.3

(51) Int. Cl.
*H04L 47/24* (2022.01)
*H04L 47/2408* (2022.01)
(Continued)

(52) U.S. Cl.
CPC ...... *H04L 47/2408* (2013.01); *G06F 9/45558* (2013.01); *H04L 12/4637* (2013.01);
(Continued)

(58) Field of Classification Search
CPC .......... H04W 47/2408; H04L 12/4641; H04L 45/745
See application file for complete search history.

(56) References Cited

U.S. PATENT DOCUMENTS

2014/0201733 A1   7/2014  Benny et al.
2014/0208317 A1   7/2014  Nakagawa
(Continued)

FOREIGN PATENT DOCUMENTS

CN       104506404 A       4/2015
CN       104639363 A       5/2015
(Continued)

*Primary Examiner* — Sulaiman Nooristany
(74) *Attorney, Agent, or Firm* — RIMON P.C.

(57) ABSTRACT

A cloud computing data center system includes a first server, a second server, a cloud management platform, and a switch. The first server includes a first computing node and a first distributed gateway. The first distributed gateway receives a management packet sent by the cloud management platform. The first distributed gateway records network information of the second VLAN. A first virtual machine sends a first service packet that carries service data to a second virtual machine. The first distributed gateway receives the first service packet, generates a second service packet by modifying the first service packet based on the network information of the second VLAN, and sends the second service packet to the switch. A second distributed gateway receives the second service packet forwarded by the switch, and sends the second service packet to the second virtual machine. In this way, network reliability may be improved.

10 Claims, 8 Drawing Sheets

(51) Int. Cl.
*G06F 9/455* (2018.01)
*H04L 12/46* (2006.01)
*H04L 45/00* (2022.01)
*H04L 45/745* (2022.01)

(52) U.S. Cl.
CPC .......... *H04L 12/4679* (2013.01); *H04L 45/66* (2013.01); *H04L 45/745* (2013.01); *G06F 2009/45579* (2013.01); *G06F 2009/45595* (2013.01)

(56) References Cited

U.S. PATENT DOCUMENTS

| | | |
|---|---|---|
| 2015/0143369 A1 | 5/2015 | Zheng et al. |
| 2015/0381495 A1 | 12/2015 | Cherian et al. |
| 2019/0280971 A1* | 9/2019 | Yu ...................... H04L 12/4641 |

FOREIGN PATENT DOCUMENTS

| | | |
|---|---|---|
| CN | 105591925 A | 5/2016 |
| CN | 108337092 A | 7/2018 |
| CN | 108337192 A | 7/2018 |
| CN | 109617735 A | 4/2019 |
| JP | 2011254378 A | 12/2011 |
| JP | 2013509090 A | 3/2013 |
| JP | 2014143560 A | 8/2014 |
| JP | 2014192790 A | 10/2014 |
| JP | 2015526992 A | 9/2015 |
| JP | 2015531212 A | 10/2015 |
| JP | 2016134876 A | 7/2016 |
| JP | 2017229027 A | 12/2017 |

\* cited by examiner

CLOUD COMPUTING DATA CENTER SYSTEM, GATEWAY, SERVER, AND PACKET PROCESSING METHOD

CROSS-REFERENCE TO RELATED APPLICATIONS

This application is a continuation of International Application No. PCT/CN2019/128497, filed on Dec. 26, 2019, which claims priority to Chinese Patent Application No. 201811602177.3, filed on Dec. 26, 2018, the disclosures of both applications hereby being incorporated by reference in their entirety.

TECHNICAL FIELD

This application relates to the field of network communications technologies, and in particular, to a cloud computing data center system, a gateway, a server, and a packet processing method.

BACKGROUND

In a cloud computing network environment, a large amount of network traffic needs to be distributed by using a gateway, and the gateway has a great impact on network performance, network scalability, reliability, system expansion, and the like of a cloud network. In the prior art, a centralized gateway is usually used. If packets sent by virtual machines on all computing nodes need to be communicated across a virtual local area network, the packets need to be first sent to the centralized gateway for processing. This leads to a problem of insufficient reliability. For example, when the bandwidth of the centralized gateway is insufficient, the bandwidth of an overall network is affected. In addition, if the centralized gateway is faulty, there will be a large area of network outage.

SUMMARY

This application provides a distributed gateway, a packet processing method, and a server. The distributed gateway is disposed locally on a computing node, one distributed gateway is disposed on each computing node, and a packet sent by a virtual machine on each computing node may be processed by using the local distributed gateway to perform cross-subnet transmission. Even if the local distributed gateway is faulty, only communication of a virtual machine on a corresponding computing node is affected and communication of virtual machines on other computing nodes is not affected. Therefore, network reliability is improved.

According to a first aspect, this application provides a packet processing method for a distributed gateway. The distributed gateway is connected to a first computing node by using a first peripheral component interconnect express (PCIe) link. The distributed gateway is connected to a switch. A first virtual machine is disposed on the first computing node, and the first virtual machine is located in a first virtual local area network (VLAN). The method includes the following steps: The distributed gateway receives a management packet sent by a cloud management platform, and the management packet carries network information of a second VLAN. The distributed gateway records the network information of the second VLAN. The distributed gateway receives a first service packet that carries service data and that is sent by the first virtual machine to a second virtual machine, and the second virtual machine is located in the second VLAN. The distributed gateway generates a second service packet based on the first service packet and the network information of the second VLAN. In some embodiments, the distributed gateway modifies the first service packet based on the network information of the second VLAN to generate a second service packet that can reach the second VLAN, where the second service packet carries the service data. The distributed gateway sends the second service packet to the switch.

Because the distributed gateway is set to receive the network information of the second VLAN sent by the cloud management platform, and modify, based on the network information, the service packet sent by the first virtual machine located in the first VLAN of the first computing node, so that a modified service packet may be transmitted to the second VLAN, and then, a gateway function is locally implemented on the first computing node.

In a first possible implementation of the first aspect, the distributed gateway includes a network adapter controller and a network adapter. The network adapter is provided with a first physical function (PF), a first virtual function (VF), and a physical network port. The network adapter controller is connected to the first PF. The first virtual machine is connected to the first VF. The physical network port is connected to the switch.

With a network adapter passthrough technology, the PF of the network adapter is passed through to the network adapter controller, and the VF of the network adapter is passed through to a virtual machine on a computing node. In this way, a calculating ability of the network adapter controller may be used to modify a packet, reducing a calculating workload of the computing node.

Optionally, the calculating ability of the network adapter controller is stronger than a calculating capability of the network adapter, and the network adapter controller is responsible for modifying the packet and communicating with the cloud management platform. The network adapter does not need to support the foregoing functions, and a packet forwarding speed of the network adapter is not affected.

According to the first possible implementation of the first aspect, in a second possible implementation, that the distributed gateway receives a first service packet that carries service data and that is sent by the first virtual machine to a second virtual machine is implemented in the following manner: The network adapter receives the first service packet from the first VF.

Because the network adapter is passed through to the first virtual machine, the service packet that is sent by the first virtual machine does not need to pass through a virtual machine manager. Therefore, a packet transmission speed may be improved.

According to the second possible implementation of the first aspect, in a third possible implementation, that the distributed gateway modifies the first service packet based on the network information of the second VLAN to generate a second service packet that can reach the second VLAN includes: The network adapter forwards the first service packet to the first PF. The network adapter controller obtains the first service packet from the first PF, modifies the first service packet based on the network information of the second VLAN to generate the second service packet, and sends the second service packet to the first PF. The network adapter sends the second service packet to the physical network port.

The network adapter controller independently modifies the packet. This does not cause an extra workload on the network adapter and does not affect the packet forwarding speed of the network adapter.

According to any one of the first to the third possible implementations of the first aspect, in a fourth possible implementation, a destination MAC address of the management packet is a MAC address of the network adapter controller. The network adapter records a third correspondence between the MAC address of the network adapter controller and the first PF. That the distributed gateway receives a management packet sent by a cloud management platform includes: The network adapter receives the management packet from the physical network port, selects the first PF from the third correspondence based on the destination MAC address of the management packet, and forwards the management packet to the first PF. The network adapter controller receives the management packet from the first PF.

Because the cloud management platform may deliver the management packet to the network adapter controller, a user may manage the distributed gateway at any time on the cloud management platform, thereby improving user experience.

According to the fourth possible implementation of the first aspect, in a fifth possible implementation, that the distributed gateway records the network information of the second VLAN includes: The network adapter controller obtains the network information of the second VLAN from the management packet, and records the network information of the second VLAN.

The network adapter controller is relatively independent of the network adapter. The network adapter records the network information of the second VLAN. This does not increase a workload of the network adapter, and does not affect the packet forwarding speed.

According to any one of the first aspect and the first to the fifth possible implementations of the first aspect, in a sixth possible implementation, the first service packet is a VLAN packet, and a destination address of the first service packet is a MAC address of the second virtual machine. A first VLAN identifier is set for the first VLAN network, and a second VLAN identifier different from the first VLAN identifier is set for the second VLAN network. The network information of the second VLAN includes a first correspondence between the MAC address of the second virtual machine and the second VLAN identifier. That the distributed gateway modifies the first service packet based on the network information of the second VLAN to generate a second service packet that can reach the second VLAN includes: The distributed gateway obtains the second VLAN identifier from the first correspondence based on the destination MAC address of the first service packet. The distributed gateway sets the second VLAN identifier in the first service packet to generate the second service packet.

Because the first virtual machine and the second virtual machine are located in different VLANs, the different VLANs cannot communicate with each other. The correspondence between the MAC address of the second virtual machine and the second VLAN identifier of the VLAN in which the second virtual machine is located is delivered to the distributed gateway by using the cloud management platform. Therefore, when receiving the service packet that is sent by the first virtual machine and whose destination address is the MAC address of the second virtual machine, the distributed gateway may set the second VLAN identifier in the service packet, so that the switch may allow the modified service packet that carries the second VLAN identifier to reach the second VLAN in which the second virtual machine is located, thereby implementing communication between virtual machines in the different VLANs.

According to any one of the first aspect and the first to the sixth possible implementations of the first aspect, in a seventh possible implementation, the first service packet is a VLAN packet, and a destination MAC address of the first service packet is a MAC address of the second virtual machine. The network information of the second VLAN includes a second correspondence between the MAC address of the second virtual machine and an IP address of another distributed gateway that is connected to a second computing node by using a second PCIe link. The second virtual machine is disposed on the second computing node. That the distributed gateway modifies the first service packet based on the network information of the second VLAN to generate a second service packet that can reach the second VLAN includes: The distributed gateway obtains the IP address from the second correspondence based on the destination address of the first service packet. The distributed gateway encapsulates the first service packet into the second service packet, where the second service packet is an overlay packet, and a destination IP address of the second service packet is the IP address.

Because the first virtual machine and the second virtual machine are located in different VLANs, the different VLANs cannot communicate with each other. The correspondence between the MAC address of the second virtual machine and the IP address of another distributed gateway is delivered to the distributed gateway by using the cloud management platform. Therefore, when receiving the service packet that is sent by the first virtual machine and whose destination address is the MAC address of the second virtual machine, the distributed gateway may encapsulate the service packet into the overlay packet, and the destination IP address of the overlay packet is the IP address of the another distributed gateway, so that the switch may route, based on the IP address, the overlay packet to the second computing node on which the second virtual machine is located and that is connected to the another distributed gateway by using the PCIe link, thereby implementing communication between virtual machines in the different VLANs.

According to a second aspect, this application provides a distributed gateway. The distributed gateway is connected to a first computing node by using a PCIe interface. The distributed gateway is connected to a switch. A first virtual machine is disposed on the first computing node, and the first virtual machine is located in a first VLAN. The distributed gateway includes: a receiving module, configured to receive a management packet sent by a cloud management platform, and the management packet carries network information of a second VLAN; a recording module, configured to record the network information of the second VLAN, where the receiving module is further configured to receive a first service packet that carries service data and that is sent by the first virtual machine to a second virtual machine, and the second virtual machine is located in the second VLAN; a conversion module, configured to modify the first service packet based on the network information of the second VLAN to generate a second service packet that can reach the second VLAN, where the second service packet carries the service data; and a sending module, configured to send the second service packet to the switch.

The second aspect or any implementation of the second aspect is an apparatus implementation corresponding to the first aspect or any implementation of the first aspect. The description in the first aspect or any implementation of the first aspect is applicable to the second aspect or any implementation of the second aspect. Details are not described herein again.

According to a third aspect, this application provides a server, including a distributed gateway and a computing node. The distributed gateway is connected to the computing node by using a peripheral component interconnect express (PCIe) interface, and the distributed gateway is connected to a switch. A first virtual machine is disposed on the computing node, and the first virtual machine is located in a first virtual local area network (VLAN). The distributed gateway is configured to receive a management packet sent by a cloud management platform, and the management packet carries network information of a second VLAN. The distributed gateway is further configured to record the network information of the second VLAN. The first virtual machine is configured to send a first service packet that carries service data to a second virtual machine, and the second virtual machine is located in the second VLAN. The distributed gateway is further configured to receive the first service packet. The distributed gateway is further configured to: modify the first service packet based on the network information of the second VLAN to generate a second service packet that can reach the second VLAN; and send the second service packet to the switch, where the second service packet carries the service data.

The third aspect or any implementation of the third aspect is a system implementation corresponding to the first aspect or any implementation of the first aspect. The description in the first aspect or any implementation of the first aspect is applicable to the third aspect or any implementation of the third aspect. Details are not described herein again.

According to a fourth aspect, this application provides a distributed gateway, including a processor and a memory. The distributed gateway is connected to a computing node on which a first virtual machine is disposed, and the distributed gateway is connected to a switch. The first virtual machine is located in a first virtual local area network (VLAN). The memory stores a program instruction. The processor runs the program instruction to perform the method according to the first aspect and any one of the possible implementations of the first aspect.

The fourth aspect or any implementation of the fourth aspect is a physical apparatus implementation corresponding to the first aspect or any implementation of the first aspect. The description in the first aspect or any implementation of the first aspect is applicable to the fourth aspect or any implementation of the fourth aspect. Details are not described herein again.

According to a fifth aspect, this application provides a cloud computing data center system, including a first server, a second server, a cloud management platform, and a switch. The first server includes a first computing node and a first distributed gateway that are connected by using a first peripheral component interconnect express (PCIe) link. The second server includes a second computing node and a second distributed gateway that are connected by using a second PCIe link. A first virtual machine located in a first virtual local area network (VLAN) is disposed on the first computing node, and a second virtual machine located in a second VLAN is disposed on the second computing node. The cloud management platform, the first distributed gateway and the second distributed gateway are separately connected to the switch. The first distributed gateway is configured to receive a management packet sent by the cloud management platform, the management packet carries network information of the second VLAN, and the first distributed gateway is configured to record the network information of the second VLAN. The first virtual machine is configured to send a first service packet that carries service data to the second virtual machine. The first distributed gateway is configured to: receive the first service packet; modify the first service packet based on the network information of the second VLAN to generate a second service packet that can reach the second VLAN; and send the second service packet to the switch, where the second service packet carries the service data. The second distributed gateway is configured to receive the second service packet forwarded by the switch, and send the service data carried in the second service packet to the second virtual machine.

Optionally, the first distributed gateway includes a first network adapter controller and a first network adapter. The first network adapter is provided with a first physical function (PF), a first virtual function (VF), and a first physical network port. The first network adapter controller is connected to the first PF, the first virtual machine is connected to the first VF, and the first physical network port is connected to the switch.

Optionally, the first network adapter is configured to receive, from the first VF, the first service packet sent by the first virtual machine.

Optionally, the first network adapter is configured to forward the first service packet to the first PF. The first network adapter controller is configured to obtain the service packet from the first PF, modify the first service packet into the second service packet based on the network information of the second VLAN, and send the second service packet to the first PF. The network adapter is further configured to obtain the second service packet from the first PF and send the second service packet to the first physical network port.

Optionally, the management packet is a VLAN packet, and a destination MAC address of the management packet is a MAC address of the first network adapter controller. The first network adapter records a third correspondence between the MAC address of the first network adapter controller and the first PF. The first network adapter is configured to receive the management packet from the first physical network port, select the first PF from the third correspondence based on the destination MAC address of the management packet, and forward the management packet to the first PF.

The first network adapter controller is configured to receive the management packet from the first PF, obtain the network information of the second VLAN from the management packet, and record the network information of the second VLAN.

Optionally, the second distributed gateway includes a second network adapter controller and a second network adapter. The second network adapter is provided with a second physical function (PF), a second virtual function (VF), and a second physical network port. The second network adapter controller is connected to the second PF, the second virtual machine is connected to the second VF, and the second physical network port is connected to the switch.

Optionally, the second network adapter is configured to receive, from the second physical network port, the second service packet sent by the switch.

Optionally, the second network adapter is configured to forward the second service packet to the second PF. The second network adapter controller is configured to: obtain the second service packet from the second PF, modify the second service packet into the first service packet, and send the first service packet to the second PF. The second adapter is further configured to obtain the first service packet from the second PF and send the first service packet to the second VF.

Optionally, the second computing node is further provided with a cloud management platform client. The cloud management platform client is configured to collect the network information of the second VLAN, and send a registration packet that carries the network information of the second VLAN to the cloud management platform.

Optionally, the first service packet and the second service packet are VLAN packets, and a destination address of the first service packet is a MAC address of the second virtual machine. A first VLAN identifier is set for a first VLAN network, and a second VLAN identifier different from the first VLAN identifier is set for the second VLAN network. The network information of the second VLAN includes a first correspondence between the MAC address of the second virtual machine and the second VLAN identifier. The first distributed gateway is configured to: obtain the second VLAN identifier from the first correspondence based on the destination MAC address of the first service packet; set the second VLAN identifier in the first service packet to generate the second service packet; and send the second service packet to the switch, where the second VLAN identifier is used to indicate the switch to send the second service packet to the second distributed gateway. The second distributed gateway is configured to receive the second service packet sent by the switch and send the second service packet to the second virtual machine.

Optionally, the first service packet is the VLAN packet, and the second service packet is an overlay packet. The destination MAC address of the first service packet is the MAC address of the second virtual machine. The network information of the second VLAN includes a second correspondence between the MAC address of the second virtual machine and an IP address of the second distributed gateway. The first distributed gateway is configured to obtain the IP address of the second distributed gateway from the second correspondence based on the destination MAC address of the first service packet, encapsulate the first service packet into the second service packet, and send the second service packet to the switch, where a destination IP address of the second service packet is the IP address of the second distributed gateway. The second distributed gateway is configured to perform decapsulation processing on the second service packet to obtain the first service packet, and send the first service packet to the second virtual machine.

DESCRIPTION OF EMBODIMENTS

Figure 1:
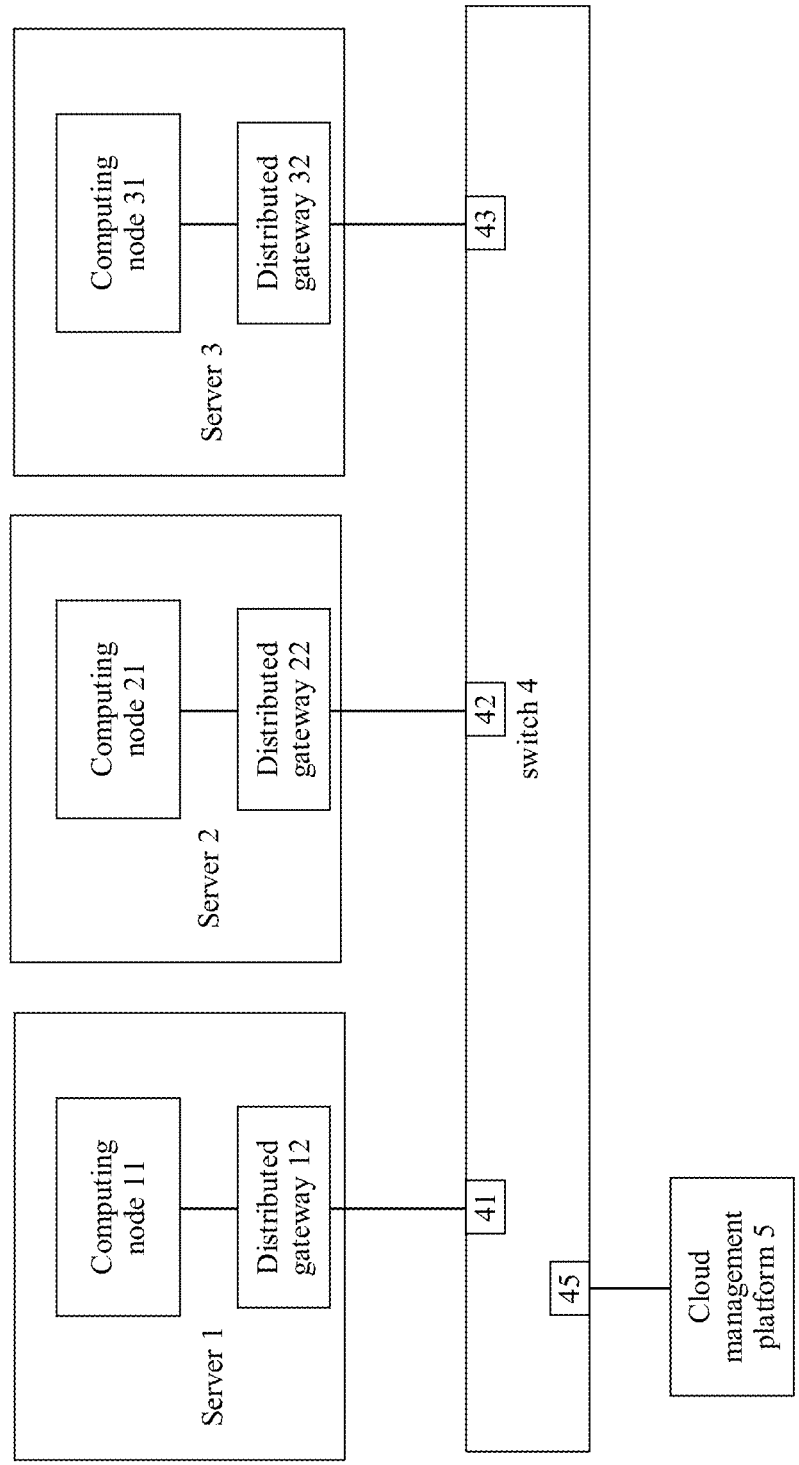
FIG. 1 is a schematic structural diagram of a system of a cloud computing data center according to an embodiment of the present disclosure.

Terms used in the embodiments of the present disclosure are first explained.

Cloud management platform: A cloud management platform is a platform configured to centrally manage virtual machines of a cloud computing network. The virtual machines of the cloud computing network are distributed in a plurality of computing nodes, and each computing node is provided with a cloud management platform client. The cloud management platform client is configured to collect state information of the virtual machine on the computing node on which the cloud management platform client is located, and report the state information to the cloud management platform. The cloud management platform is provided with a user interaction interface, and a user may obtain the state of the virtual machine by using the user interaction interface. The user may further configure a management operation that is for the virtual machine by using the user interaction interface. The cloud management platform may send a command corresponding to the management operation to the cloud management platform client, and the cloud management platform client may run this command to manage the virtual machine. For example, the cloud management platform may be, for example, an Openstack or a VMware vSphere.

Overlay packet: An overlay packet is an Ethernet packet in which a virtual machine packet is encapsulated. The overlay packet includes an outer network address and an inner network address. The outer network address is a network address in a packet header of the Ethernet packet, and includes a source IP address, a destination IP address, a source MAC address, and a destination MAC address. The inner network address is a network address in a packet header of the virtual machine packet, and includes the source IP address, the destination IP address, the source MAC address, and the destination MAC address. An implementation of the overlay packet may be a virtual extensible local area network (VXLAN) packet, a network virtualization generic routing encapsulation (NVGRE) packet, or a stateless transport tunneling (STT) packet. It should be noted that, in the embodiments of the present disclosure, the overlay packet may be a VXLAN packet.

Network adapter virtualization: Network adapter virtualization may include single-root input/output virtualization (SR-IOV) or multi-root input/output virtualization (MR-IOV). The network adapter virtualization is also referred to as network adapter passthrough. SR-IOV passthrough is used as an example. When the network adapter supports the SR-IOV, a network adapter on a host may be shared by several virtual machines running on the host by using an SR-IOV technology. When the host uses the network adapter supporting the SR-IOV, a network port of the network adapter may virtualize at least one physical function (PF)

and a plurality of virtual functions (VF). The virtual machine on the host is connected to at least one VF. The network adapter contains a switching device that has a function of a switch. The switching device forwards a data packet based on a media access control (MAC) table, and is responsible for forwarding of a data packet between the PF, the VF, and a physical network port.

Virtual local area network (VLAN): A virtual local area network is a communication technology that logically divides a physical LAN into a plurality of broadcast domains.

VLAN packet: A VLAN packet belongs to a layer 2 packet, and includes a destination MAC field, a source MAC field, a VLAN ID field, and a payload field. A VLAN packet also includes other fields that may not mentioned in the embodiments of the present disclosure, and are not described herein again.

Virtual local area network identifier (VLAN ID): A virtual local area network identifier is a VID field of a VLAN packet. This field uniquely identifies one VLAN. A 12-bit VID may represent 4096 different values. One Ethernet may be divided into a maximum of 4094 VLANs other than VLANs of two reserved values.

Referring to FIG. 1, FIG. 1 is a schematic structural diagram of a system of a cloud computing data center according to an embodiment of the present disclosure. As shown in FIG. 1, the cloud computing data center includes a server 1, a server 2, a server 3, a switch 4, and a cloud management platform 5.

The server 1 includes a computing node 11 and a distributed gateway 12, the server 2 includes a computing node 21 and a distributed gateway 22, and the server 3 includes a computing node 31 and a distributed gateway 32. The computing node may be, for example, a physical host.

It should be noted that, for ease of description, FIG. 1 shows only three servers. However, in a practical application, there may be another quantity of servers. This is not limited in this embodiment of the present disclosure.

In some embodiments of the present disclosure, the distributed gateway may be connected to the computing node by using a peripheral component interconnect express (PCIe) interface. In addition, the distributed gateway may be connected to the switch by using a physical network port.

The switch 4 may be, for example, a top of rack (TOR) switch. For example, the servers 1 to 3 may be disposed on a same rack, and are separately connected to TOR switches located on the top of the rack. In the cloud computing data center, one TOR switch is disposed on one rack, a plurality of blade servers are installed in each rack, and the racks are cross-rack connected by using the TOR switches.

In some embodiments of the present disclosure, the switch 4 has a layer 3 forwarding function. For example, the switch 4 allows a layer 3 packet to pass through ports 41 to 43. The switch 4 further records a correspondence between an IP address in the server 1 and the port 41 connecting the switch 4 and the server 1. When the layer 3 packet is received, and if a destination IP address of the layer 3 packet is the IP address in the server 1, the switch 4 sends the layer 3 packet to the port 41, to implement the layer 3 forwarding function.

Similarly, the switch 4 further records a correspondence between an IP address in the server 2 and the port 42 connecting the switch 4 and the server 2. When the layer 3 packet is received, and if the destination IP address of the layer 3 packet is the IP address in the server 2, the switch 4 sends the layer 3 packet to the port 42.

The IP address in the server 1 includes an IP address of the distributed gateway 12, and the IP address in the server 2 includes an IP address of the distributed gateway 22.

Further, the switch 4 may implement VLAN isolation. For example, the port 41 connecting the switch 4 and the server 1 is set to allow only a VLAN packet whose VLAN ID is 1 to enter the server 1, the port 42 connecting the switch 4 and the server 2 is set to allow only a VLAN packet whose VLAN ID is 2 to enter the server 2, and the port 43 connecting the switch 4 and the server 3 is set to allow only a VLAN packet whose VLAN ID is 3 to enter the server 3. A port 45 connecting the switch 4 and the cloud management platform 5 is set to allow only a VLAN packet whose VLAN ID is 5 to enter the cloud management platform 5.

In some embodiments of the present disclosure, one VLAN is formed inside the server 1, and a VLAN ID of the VLAN is 1. One VLAN is formed inside the server 2, and a VLAN ID of the VLAN is 2. One VLAN is formed inside the server 3, and a VLAN ID of the VLAN is 3. The switch 4 is provided with the port 41, the port 42, the port 43, and the port 45. For example, after receiving the VLAN packet whose VLAN ID is 1, the switch 4 broadcasts the packet to each port, and only the port 41 allows the packet to pass through.

In some embodiments of the present disclosure, the switch 4 is configured to ignore a destination MAC address of a packet, and select, based on only the VLAN ID, to which port the packet is to be sent. In some other examples of the present disclosure, the switch 4 may be configured to select the port based on the destination MAC address of the packet.

In some embodiments of the present disclosure, the cloud management platform 5 may be disposed on one computing node, and is implemented by using software installed on the computing node; or the cloud management platform 5 may be implemented by using a dedicated network device. This is not limited in this embodiment of the present disclosure, and the servers 1 to 3 may communicate with the cloud management platform 5.

Figure 2:
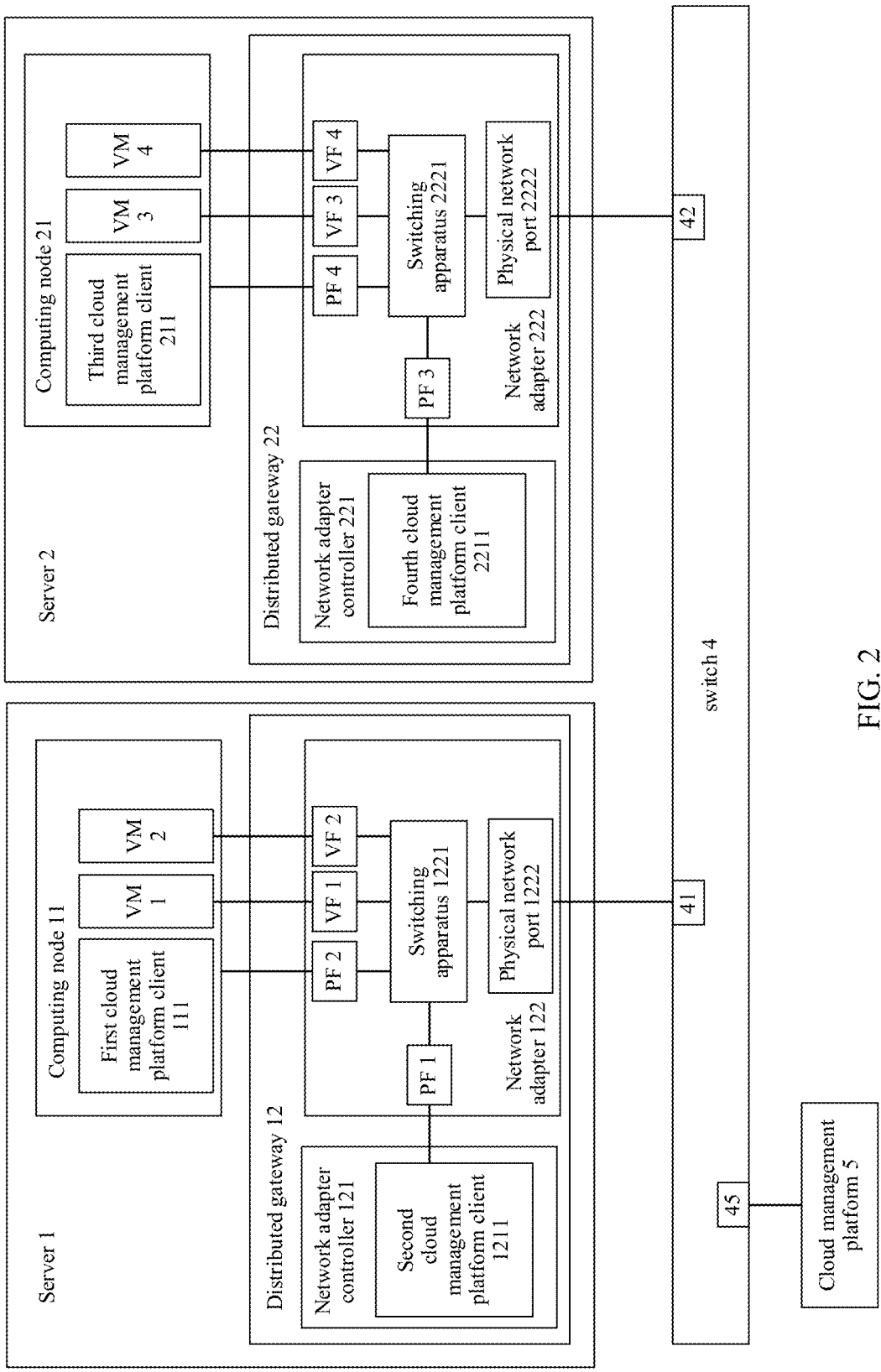
FIG. 2 is another schematic structural diagram of a system of a cloud computing data center according to an embodiment of the present disclosure.

Referring to FIG. 2, FIG. 2 is another schematic structural diagram of a system of a cloud computing data center according to an embodiment of the present disclosure. FIG. 2 is a further description of FIG. 1. In addition, for clarity of description, the server 3 in FIG. 1 is omitted in FIG. 2 and only structures of the server 1 and the server 2 are shown in FIG. 2.

As shown in FIG. 2, the computing node 11 includes a first cloud management platform client 111, a virtual machine VM 1, and a virtual machine VM 2. The distributed gateway 12 includes a network adapter controller 121 and a network adapter 122. The network adapter controller 121 includes a second cloud management platform client 1211. The network adapter 122 supports a network adapter pass-through function. The network adapter 122 includes a switching apparatus 1221, a physical network port 1222, a PF 1, a PF 2, a VF 1, and a VF 2.

For example, the switching apparatus 1221 may be implemented by using software, for example, Open vswitch.

In addition, an operating system may run on the computing node 11, and the first cloud management platform client 111 may be installed in the operating system as third-party software. The first cloud management platform client 111 may be, for example, a nova agent component of an openstack, and the nova agent component may communicate with a nova component of the cloud management platform 5. An operating system may also run on the network adapter controller 121, and a second cloud management platform client 1211 may be installed in the operating system as third-party software. The second cloud management platform client 1211 may be, for example, a neutron agent component of the openstack, and the neutron agent component may communicate with a neutron component of the cloud management platform 5. It should be noted that the computing node 11 may be, for example, an X86 platform-based physical server, and the network adapter controller 121 may be, for example, an ARM platform-based intelligent board card based on.

In some embodiments of the present disclosure, the distributed gateway 12 includes the network adapter controller 121 and the network adapter 122 that are connected to each other. The network adapter controller 121 and the network adapter 122 may be connected by using a PCIe interface. The network adapter controller 121 has a better computing capability than the network adapter 122, to implement fast packet processing, for example, cross-network transmission implemented based on a management packet. In addition, the network adapter 122 has the passthrough function. The PF 1 of the network adapter 122 is passed through to the network adapter controller 121, and the network adapter controller 121 is connected to the PF 1 of the network adapter 122. The VF 1 of the network adapter 122 is passed through to the VM 1, and the VM 1 is connected to the VF 1 of the network adapter 122.

Further, the physical network port 1222 is connected to the port 41 of the switch 4. The operating system of the computing node 11 is connected to the PF 2, and the first cloud management platform client 111 running on the operating system of the computing node 11 may be connected to the network adapter 122 by using the PF 2.

The server 2 and the server 1 have a similar structure. For details, refer to FIG. 2. Details are not described herein again.

In addition, in some embodiments of the present disclosure, the first cloud management platform client 111 and a third cloud management platform client 211 pre-record a VLAN ID 5, and communicate with the cloud management platform 5 based on the VLAN ID 5.

In addition, the cloud management platform 5 pre-records a MAC address of a network adapter controller 221 and a MAC address of the network adapter controller 121. The cloud management platform 5 communicates with the network adapter controller 221 based on the MAC address of the network adapter controller 221, and communicates with the network adapter controller 121 based on the MAC address of the network adapter controller 121.

Further, a MAC table of the switching apparatus 1221 records:
a VLAN ID 1;
a correspondence between a MAC address of the VM 1 and the VF 1;
a correspondence between a MAC address of the VM 2 and the VF 2;
a correspondence between a MAC address of the computing node 11 and the PF 2; and
a correspondence between the MAC address of the network adapter controller 121 and the PF 1.

When the switching apparatus 1221 cannot find a MAC address of a received packet in the local MAC table, the switching apparatus 1221 sends the packet to the PF 1. When determining that a VLAN ID of the packet is not 1, the switching apparatus 1221 sends the packet to the physical network port 1222.

Further, if the switching apparatus 1221 receives the layer 3 packet from the physical network port 1222, the switching apparatus 1221 first forwards the layer 3 packet to the PF 1.

Similarly, a MAC table of the switching apparatus 2221 records:
a VLAN ID 2;
a correspondence between a MAC address of a VM 3 and a VF 3;
a correspondence between a MAC address of a VM 4 and a VF 4;
a correspondence between a MAC address of a computing node 21 and a PF 4; and
a correspondence between the MAC address of the network adapter controller 221 and a PF 3.

When the switching apparatus 2221 cannot find the MAC address of the received packet in the local MAC table, the switching apparatus 2221 sends the packet to the PF 3. When determining that the VLAN ID of the packet is not 2, the switching apparatus 2221 sends the packet to a physical network port 2222.

Further, if the switching apparatus 2221 receives the layer 3 packet from the physical network port 2222, the switching apparatus 2221 first forwards the layer 3 packet to the PF 3.

In addition, in some embodiments of the present disclosure, the distributed gateway has a function of the network adapter, and an IP address of the distributed gateway may be used as an IP address that is of the computing node connected to the distributed gateway by using a PCIe link and that is exposed to an external network.

Figure 3:
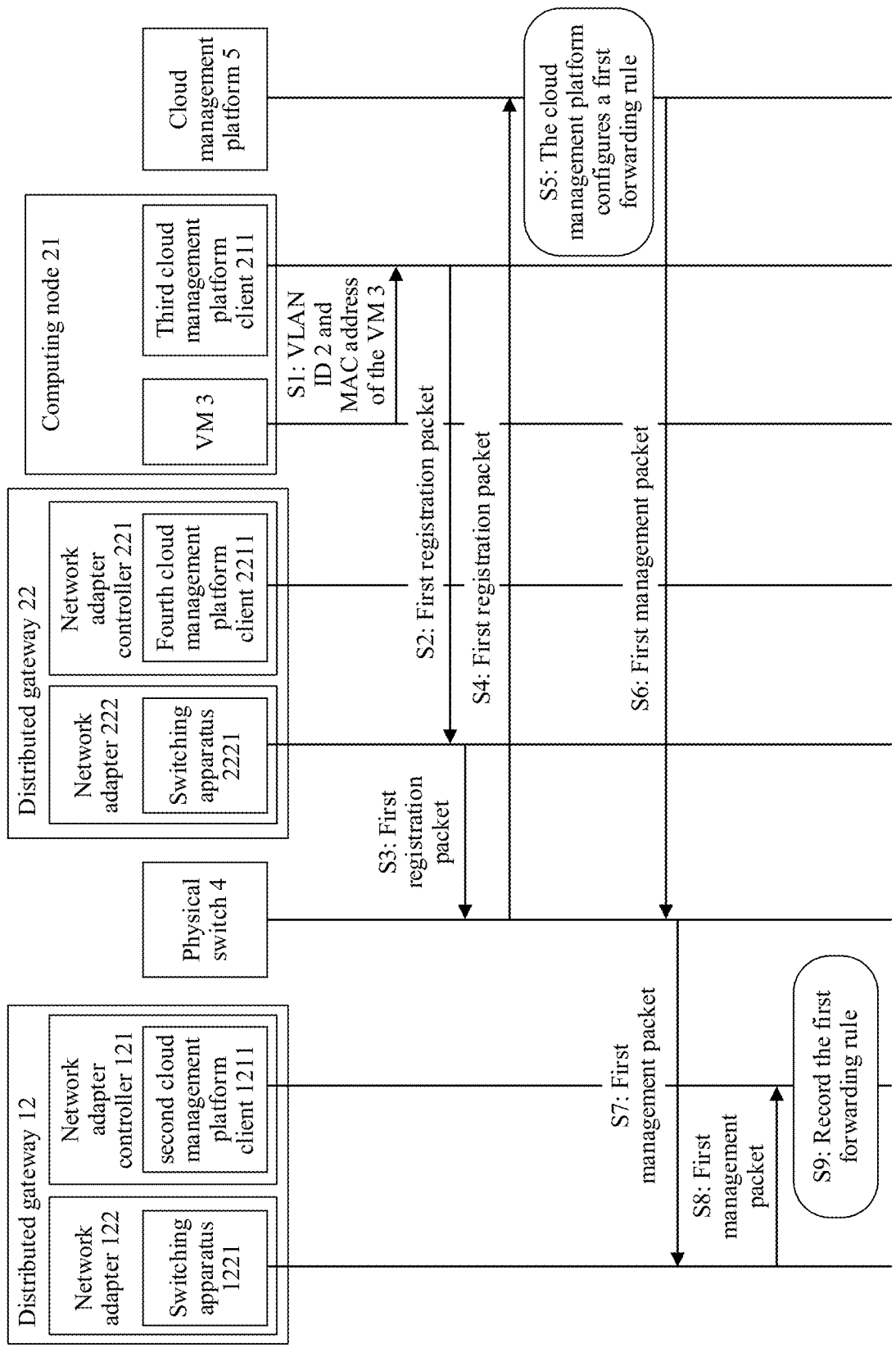
FIG. 3 is a data interaction diagram of a packet processing method according to an embodiment of the present disclosure.

Referring to FIG. 3, FIG. 3 is a data interaction diagram of a packet processing method according to an embodiment of the present disclosure. As shown in FIG. 3, the packet processing method includes the following steps.

Step S1: A third cloud management platform client 211 obtains a VLAN ID 2 and a MAC address of a VM 3.

The VLAN ID 2 is an identifier of a VLAN in which the VM 3 is located. A VM 1 and the VM 3 belong to different virtual local area networks, and a VLAN ID of the VM 1 is different from a VLAN ID of the VM 3.

Step S2: The third cloud management platform client 211 sends a first registration packet to a network adapter 222.

The first registration packet may be, for example, a VLAN packet, a VLAN ID of the first registration packet is a VLAN ID 5, and a payload of the first registration packet carries the VLAN ID 2 and the MAC address of the VM 3.

The third cloud management platform client 211 sends the first registration packet to a PF 4 of the network adapter 222. A switching apparatus 2221 of the network adapter 222 obtains the first registration packet from the PF 4, determines that the VLAN ID of the first registration packet is not the VLAN ID 2, and sends the first registration packet to a physical network port 2222.

Step S3: The switching apparatus 2221 sends the first registration packet to a port 42 of a switch 4 by using the physical network port 2222.

Step S4: The switch 4 receives the first registration packet from the port 42, and sends the first registration packet to a port 45 based on the VLAN ID 5 of the first registration packet. A cloud management platform 5 receives the first registration packet from the port 45.

It should be noted that, in some embodiments of the present disclosure, a first cloud management platform client 111 may also obtain a VLAN ID and a MAC address of a virtual machine on a computing node 11 and report the VLAN ID and the MAC address to the cloud management platform 5, which is not limited in the present disclosure.

Step S5: The cloud management platform 5 obtains the VLAN ID 2 and the MAC address of the VM 3 from the payload of the first registration packet, and configures network information of a second VLAN based on the VLAN ID 2 and the MAC address of the VM 3. The network information of the second VLAN includes a first correspondence between the VLAN ID 2 of the second VLAN and the MAC address of the VM 3 located in the second VLAN.

For example, the cloud management platform 5 provides a user interaction interface. A user selects on the user interaction interface and configures the network information of the second VLAN for the computing node 11, so that the network information of the second VLAN is applicable to all virtual machines on the computing node 11.

Step S6: The cloud management platform 5 sends a first management packet to the port 45 of the switch 4.

The first management packet is the VLAN packet, a destination address of the first management packet is a MAC address of a network adapter controller 121, a VLAN ID of the first management packet is 1, and a payload of the first management packet carries the network information of the second VLAN.

Step S7: The switch 4 sends the first management packet to a physical network port 1222 of a network adapter 122 based on the VLAN ID 1 of the first management packet.

Step S8: The network adapter 122 sends the first management packet to the network adapter controller 121.

A switching apparatus 1221 of the network adapter 122 obtains the first management packet from the physical network port 1222, selects a PF 1 based on the destination MAC address of the first management packet, and sends the first management packet to the PF 1. A second cloud management platform client 1211 of the network adapter controller 121 obtains the first management packet from the PF 1.

Step S9: The third cloud management platform client 1211 obtains the network information of the second VLAN from the first management packet, and records the network information of the second VLAN.

In conclusion, the third cloud management platform client 1211 may record the network information of the second VLAN of all the virtual machines configured by the user on the computing node 11, and subsequently, cross-VLAN communication may be implemented by using the network information of the second VLAN.

It should be noted that, in some embodiments of the present disclosure, the first cloud management platform client 111 may also obtain the VLAN ID 1 and a MAC address of the VM 1, and report the VLAN ID 1 and the MAC of the VM 1 as network information of a first VLAN to the cloud management platform 5.

Figure 4:
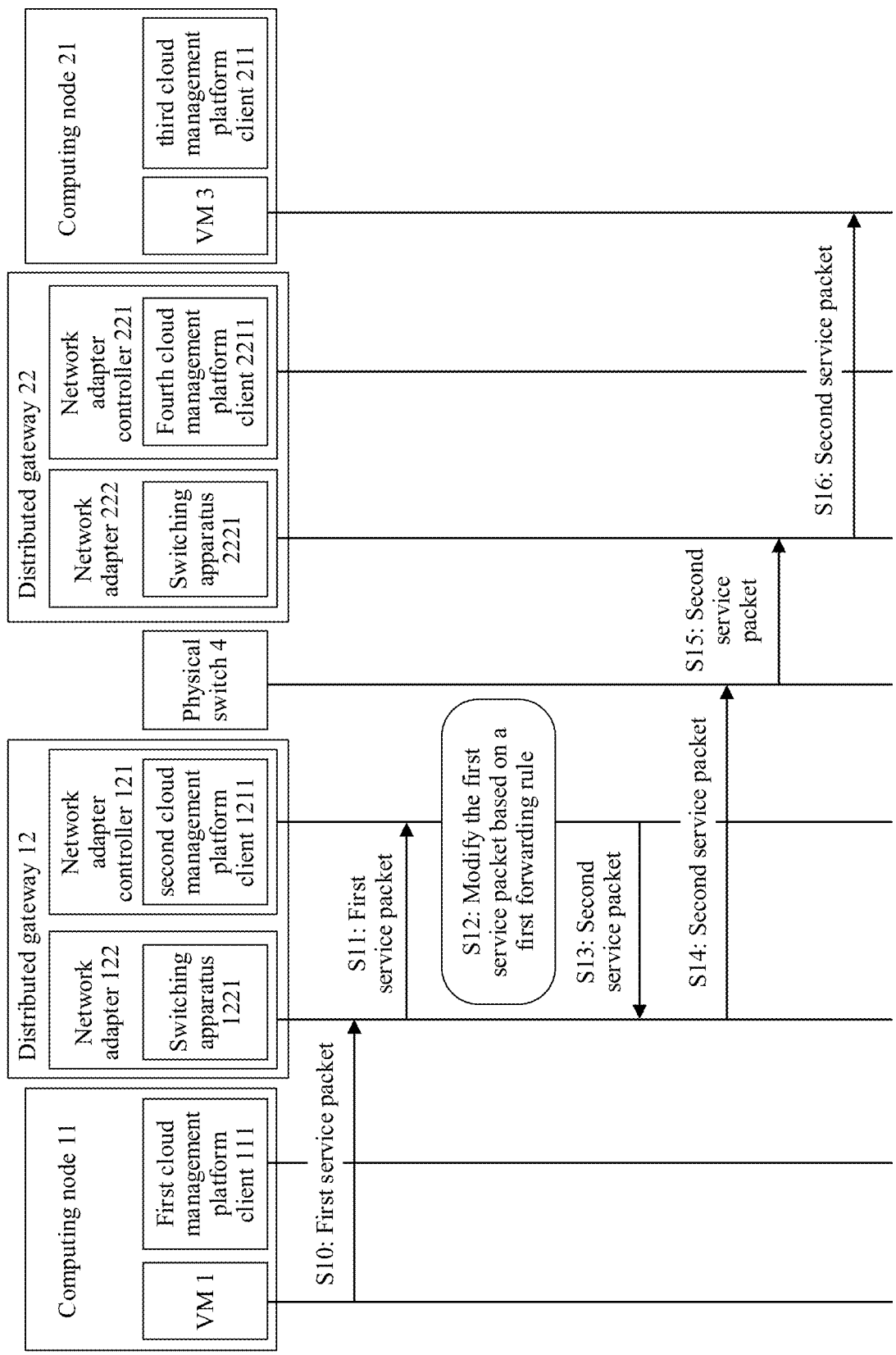
FIG. 4 is another data interaction diagram of a packet processing method according to an embodiment of the present disclosure.

Referring to FIG. 4, FIG. 4 is another data interaction diagram of a packet processing method according to an embodiment of the present disclosure. FIG. 4 is a continuation of FIG. 3. The packet processing method further includes the following steps.

Step S10: The VM 1 sends a first service packet to the network adapter 122.

The first service packet is the VLAN packet, a source MAC address of the first service packet is the MAC address of the VM 1, a destination MAC address of the first service packet is the MAC address of the VM 3, and a payload of the first service packet carries service data. In some embodiments of the present disclosure, before the VM 1 sends the first service packet to the VM 3, the VLAN ID of the VLAN network in which the VM 3 is located is unknown. Therefore, the VM 1 sets a VLAN ID of the first service packet to null, and the VM 1 sends the first service packet to a VF 1.

Step S11: The network adapter 122 forwards the first service packet to the network adapter controller 121.

The network adapter 122 obtains the first service packet from the VF 1, determines that the destination MAC address of the first service packet, namely, the MAC address of the VM 3, is not locally, and forwards the first service packet to the PF 1.

Step S12: The network adapter controller 121 modifies the first service packet based on the network information of the second VLAN.

The third cloud management platform client 1211 may obtain the first service packet from the PF 1, obtain the VLAN ID 2 from the network information of the second VLAN based on the destination MAC address of the first service packet, and set the VLAN ID of the first service packet to the VLAN ID 2. Therefore, a second service packet that carries the VLAN ID 2 is generated, and a payload of the second service packet carries the service data.

The port 42 connecting the switch 4 and a server 2 allows only a packet with the VLAN ID 2 to pass through. If the first service packet is directly sent to the switch 4, the switch 4 determines that the VLAN ID carried in the first service packet is null, and broadcasts the first service packet to all ports of the switch 4. Because the port 42 allows only the packet with the VLAN ID 2 to pass through, the port 42 does not send the first service packet to the server 2.

Therefore, the third cloud management platform client 1211 in some embodiments of the present disclosure modifies the first service packet to the second service packet, to ensure that the switch 4 can send the second service packet to the server 2 by using the port 42.

Step S13: The network adapter controller 121 sends the second service packet to the network adapter 122.

The network adapter controller 121 sends the second service packet to the PF 1, and the switching apparatus 1221 of the network adapter 122 obtains the second service packet from the PF 1.

Step S14: The network adapter 122 sends the second service packet to the switch 4.

The switching apparatus 1221 of the network adapter 122 determines that a VLAN ID of the second service packet is not 1, and sends the second service packet to the physical network port 1222.

Step S15: The switch 4 receives the second service packet from a port 41, and forwards the second service packet to the network adapter 222.

The switch 4 sends the second service packet to the port 42 based on the VLAN ID 2 of the second service packet, so that the second service packet reaches a physical network port 2222.

Step S16: The network adapter 222 forwards the second service packet to the VM 3.

The switching apparatus 2221 of the network adapter 222 obtains the second service packet from the physical network port 2222, selects a VF 3 based on a destination MAC address of the second service packet, and sends the second service packet to the VF 3. The VM 3 obtains the second service packet from the VF 3. The VM 3 may obtain the service data from the payload of the second service packet, to perform service processing based on the service data.

Because a distributed gateway 12 modifies the first service packet to the second service packet configured with the VLAN ID 2, the second service packet may be successfully transmitted to the server 2 by using the switch 4, thereby implementing cross-VLAN communication.

Figure 5:
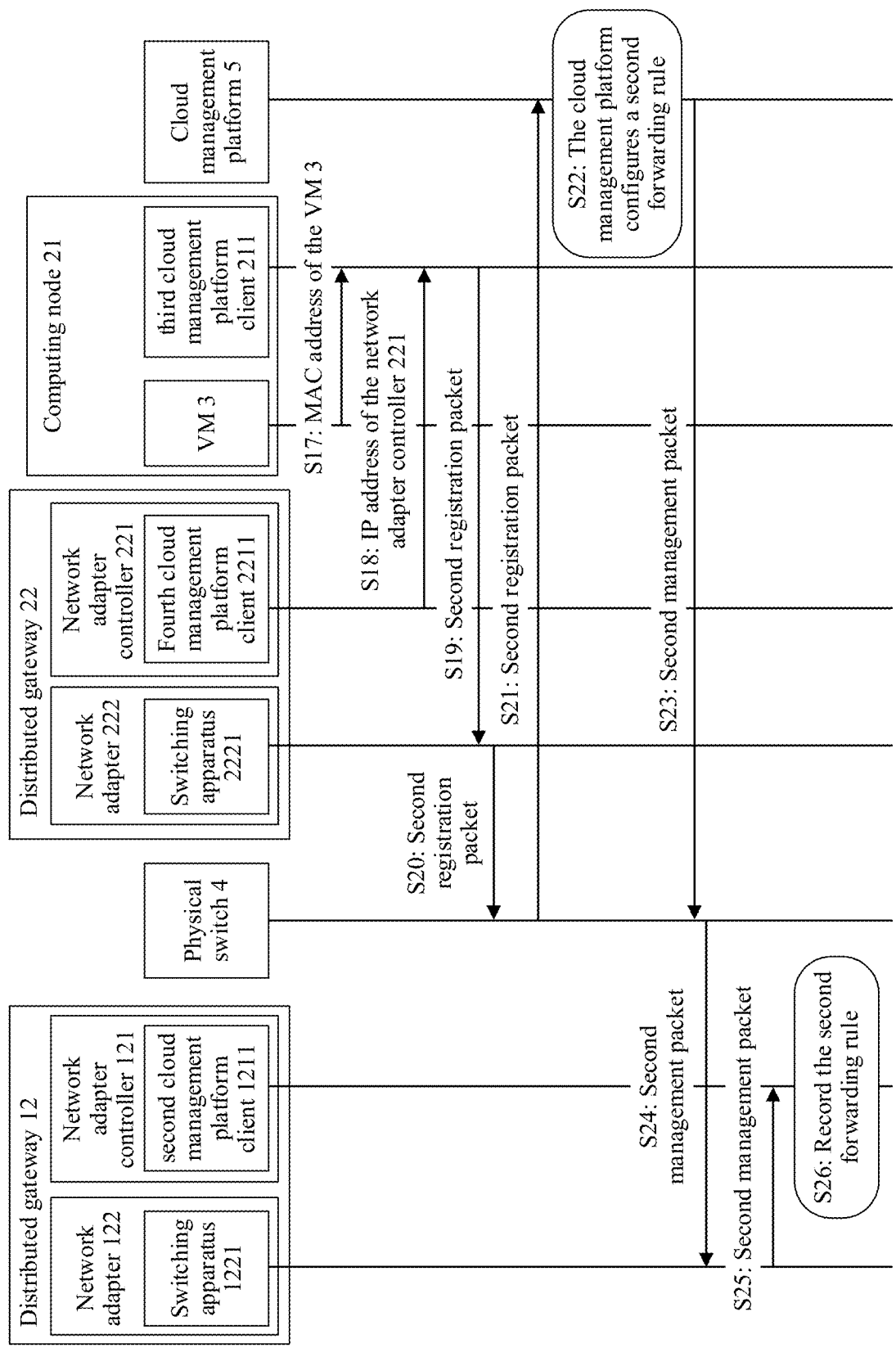
FIG. 5 is another data interaction diagram of a packet processing method according to an embodiment of the present disclosure.

The foregoing embodiments show a process in which the distributed gateway implements cross-VLAN packet transmission. It should be noted that, in the embodiments of the present disclosure, the distributed gateway may also implement encapsulation of an overlay packet, to implement large layer 2 cross-network communication. For details, refer to FIG. 5. FIG. 5 is another data interaction diagram of a packet processing method according to an embodiment of the present disclosure.

As shown in FIG. 5, the packet processing method includes the following steps.

Step S17: A third cloud management platform client 211 obtains a MAC address of a VM 3.

Step S18: The third cloud management platform client 211 obtains an IP address of a network adapter controller 221.

It should be noted that, in some embodiments of the present disclosure, the IP address of the network adapter controller 221 may be used as external IP addresses of a distributed gateway 22 and a computing node.

Step S19: The third cloud management platform client 211 generates a second registration packet, and sends the second registration packet to a network adapter 222.

The second registration packet is a VLAN packet, a payload of the second registration packet carries the MAC address of the VM 3 and an IP address of the distributed gateway 12, and a VLAN ID of the second registration packet is 5.

The third cloud management platform client 211 sends the second registration packet to a PF 4.

Step S20: The network adapter 222 sends a second registration packet to a switch 4.

A switching apparatus 2221 of the network adapter 222 obtains the second registration packet from the PF 4, determines that the VLAN ID of the second registration packet is not 2, and sends the second registration packet to a physical network port 2222.

Step S21: The switch 4 forwards the second registration packet to a cloud management platform 5 based on the VLAN ID 5 of the second registration packet.

The switch 4 receives the second registration packet from a port 42 connecting the switch 4 and the physical network port 2222, and sends the second registration packet to a port 45 based on the VLAN ID 5 of the second registration packet. The cloud management platform 5 receives the second registration packet from the port 45.

It should be noted that, in some embodiments of the present disclosure, a first cloud management platform client 111 may also obtain a MAC address of a virtual machine on a computing node 21 and an IP address of the computing node 21, and report the MAC address and the IP address to the cloud management platform 5, which is not limited in this embodiment of the present disclosure.

Step S22: The cloud management platform 5 receives the second registration packet, obtains the MAC address of the VM 3 and the IP address of the computing node 21 from the second registration packet, and configures network information of a second VLAN. The network information of the second VLAN includes a correspondence between the MAC address of the VM 3 and the IP address of the computing node 21.

Optionally, a user may configure the network information of the second VLAN for the computing node 11 by using the cloud management platform 5.

Step S23: The cloud management platform 5 generates a second management packet, and sends the second management packet to the switch 4.

The second management packet may be the VLAN packet, a destination MAC address of the second management packet is a MAC address of a network adapter controller 121, a VLAN ID carried in the second management packet is 1. The MAC address and the VLAN ID may be defined by the user. If the user wants to perform forwarding configuration on all virtual machines on the computing node 11, the MAC address of the network adapter controller 121 that is connected to the computing node 11 and a VLAN ID 2 that is allowed to pass through a port 41 of the switch 4 may be selected by using the cloud management platform 5.

Step S24: The switch 4 sends the second management packet to a network adapter 122.

The switch 4 sends the second management packet to the port 41 based on the VLAN ID 1 of the second management packet, and the port 41 allows the second management packet to enter a physical network port 1222 of the network adapter 122.

Step S25: The network adapter 122 sends the second management packet to the network adapter controller 121.

A switching apparatus 1221 of the network adapter 122 obtains the second management packet from the physical network port 1222, selects a PF 1 based on the destination MAC address of the second management packet, and sends the second management packet to the PF 1.

Step S26: The network adapter controller 121 obtains the network information of the second VLAN from the second management packet, and records the network information of the second VLAN.

A third cloud management platform client 1211 of the network adapter controller 121 obtains the second management packet from the PF 1, obtains the network information of the second VLAN carried in the second management packet, and records the network information of the second VLAN.

It should be noted that, in some embodiments of the present disclosure, the first cloud management platform client 111 may also obtain a MAC address of a VM 1 and an IP address of the computing node 11, and report the MAC address of the VM 1 and the IP address of the computing node 11 as network information of a first VLAN to the cloud management platform 5.

Figure 6:
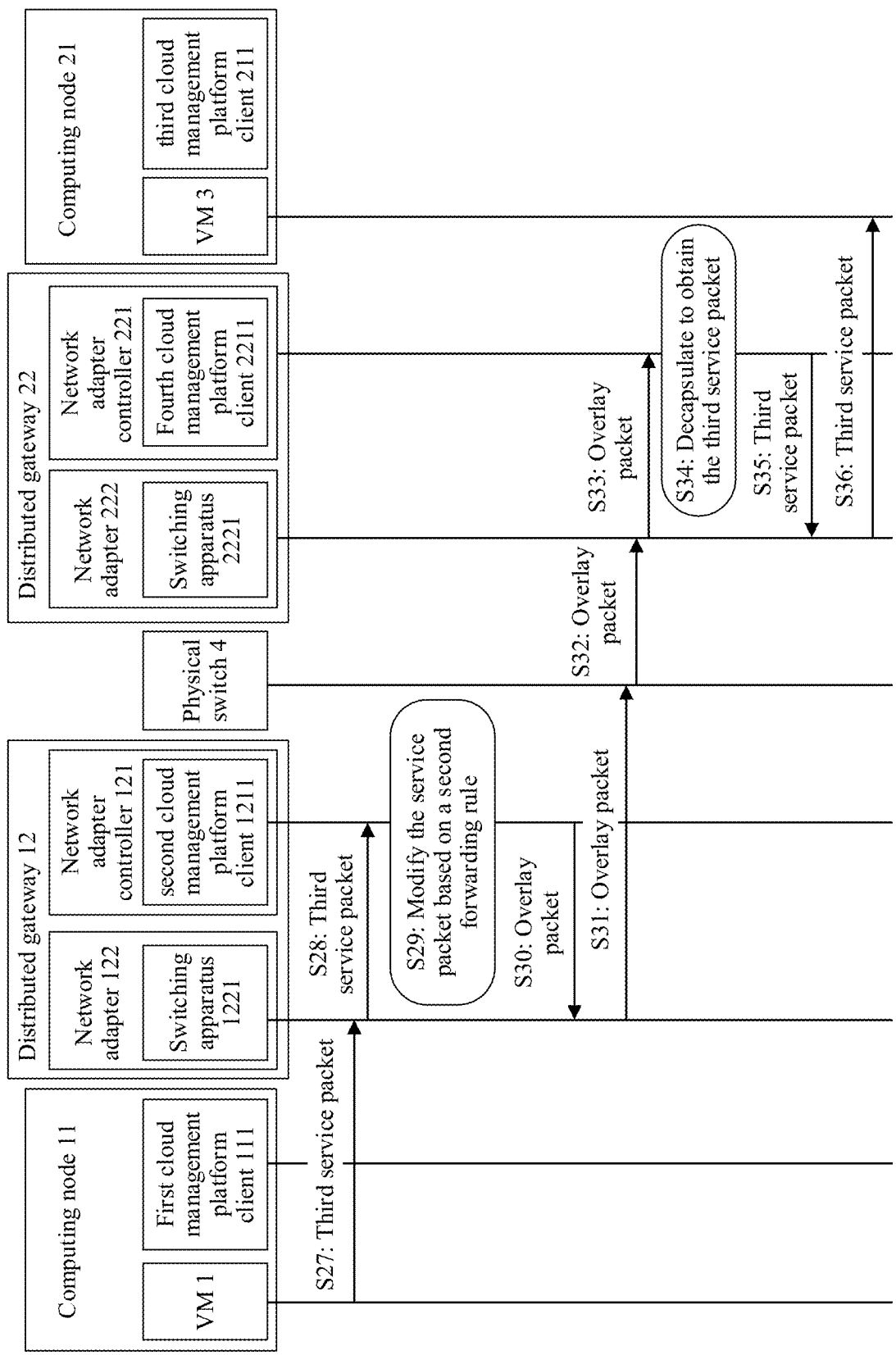
FIG. 6 is another data interaction diagram of a packet processing method according to an embodiment of the present disclosure.

Referring to FIG. 6, FIG. 6 is another data interaction diagram of a packet processing method according to an embodiment of the present disclosure. FIG. 6 is a continuation of FIG. 5. Following FIG. 5, the packet processing method further includes the following steps.

Step S27: The VM 1 sends a third service packet to the network adapter 122.

The third service packet is the VLAN packet, a source MAC address of the third service packet is the MAC address of the VM 1, a destination MAC address of the third service packet is the MAC address of the VM 3, and a payload of the third service packet carries service data. The VM 1 does not know a VLAN ID of a VLAN network in which the VM 3 is located, a VLAN ID of the third service packet is null, and the VM 1 sends the third service packet to a VF 1.

Step S28: The network adapter 122 forwards the third service packet to the network adapter controller 121.

The network adapter 122 obtains the third service packet from the VF 1, determines that the MAC address of the VM 3 is not locally, and forwards the third service packet to the PF 1.

Step S29: The network adapter controller 121 modifies the third service packet based on the network information of the second VLAN.

The third cloud management platform client 1211 obtains the third service packet from the PF 1, obtains an IP address of the distributed gateway 12 from the network information of the second VLAN based on the destination MAC address of the third service packet, and encapsulates the third service packet into an overlay packet. A destination IP address of the overlay packet is the IP address of the computing node 21, and a destination MAC address of the overlay packet is a MAC address of a next-hop device of the computing node 21. The overlay packet carries the third service packet.

For example, the overlay packet may be a VXLAN packet.

Step S30: The network adapter controller 121 sends the overlay packet to the network adapter 122.

The third cloud management platform client 1211 of the network adapter controller 121 sends the overlay packet to the PF 1, and the switching apparatus 1221 of the network adapter 122 obtains the overlay packet from the PF 1.

Step S31: The network adapter 122 sends the overlay packet to the switch 4.

The switching apparatus 1221 of the network adapter 122 determines that the destination MAC address of the overlay packet is not locally, and sends the overlay packet to the physical network port 1222, so that the overlay packet reaches the switch 4.

Step S32: The switch 4 receives the overlay packet from the port 41, and forwards the overlay packet to the network adapter 222.

The switch 4 sends the overlay packet to the port 42 based on the destination IP address of the overlay packet, and the switching apparatus 2221 obtains the overlay packet from a physical port 2222.

Step S33: The network adapter 222 forwards the overlay packet to a network adapter controller 221.

The switching apparatus 2221 of the network adapter 222 obtains the overlay packet from the physical network port 2222, selects a PF 3 based on the destination IP address of the overlay packet, and sends the overlay packet to the PF 3.

Step S34: The network adapter controller 221 decapsulates the overlay packet to obtain the third service packet carried in the overlay packet.

A fourth cloud management platform client 2211 of the network adapter controller 221 obtains the overlay packet from the PF 3, and decapsulates the overlay packet to obtain the third service packet carried in the overlay packet.

Step S35: The network adapter controller 221 sends the third service packet to the network adapter 222.

The fourth cloud management platform client 2211 of the network adapter controller 221 sends the third service packet to the PF 3.

Step S36: The network adapter 222 sends the third service packet to the VM 3.

The switching apparatus 2221 of the network adapter 222 obtains the third service packet from the PF 3, selects a VF 3 based on the destination MAC address of the third service packet, and sends the third service packet to the VF 3. The VM 3 obtains the third service packet from the VF 3, obtains the service data from the payload of the third service packet, and performs service processing based on the service data.

Because a distributed gateway 12 modifies the third service packet to the overlay packet, the overlay packet may be successfully transmitted to a server 2 by using the switch 4, to implement cross-VLAN communication.

In conclusion, when a local distributed gateway of a server is faulty, only a local VM of the server is affected.

Being configured with distributed gateways, other servers are not affected. A network is not affected by a single faulty distributed gateway.

Figure 7:
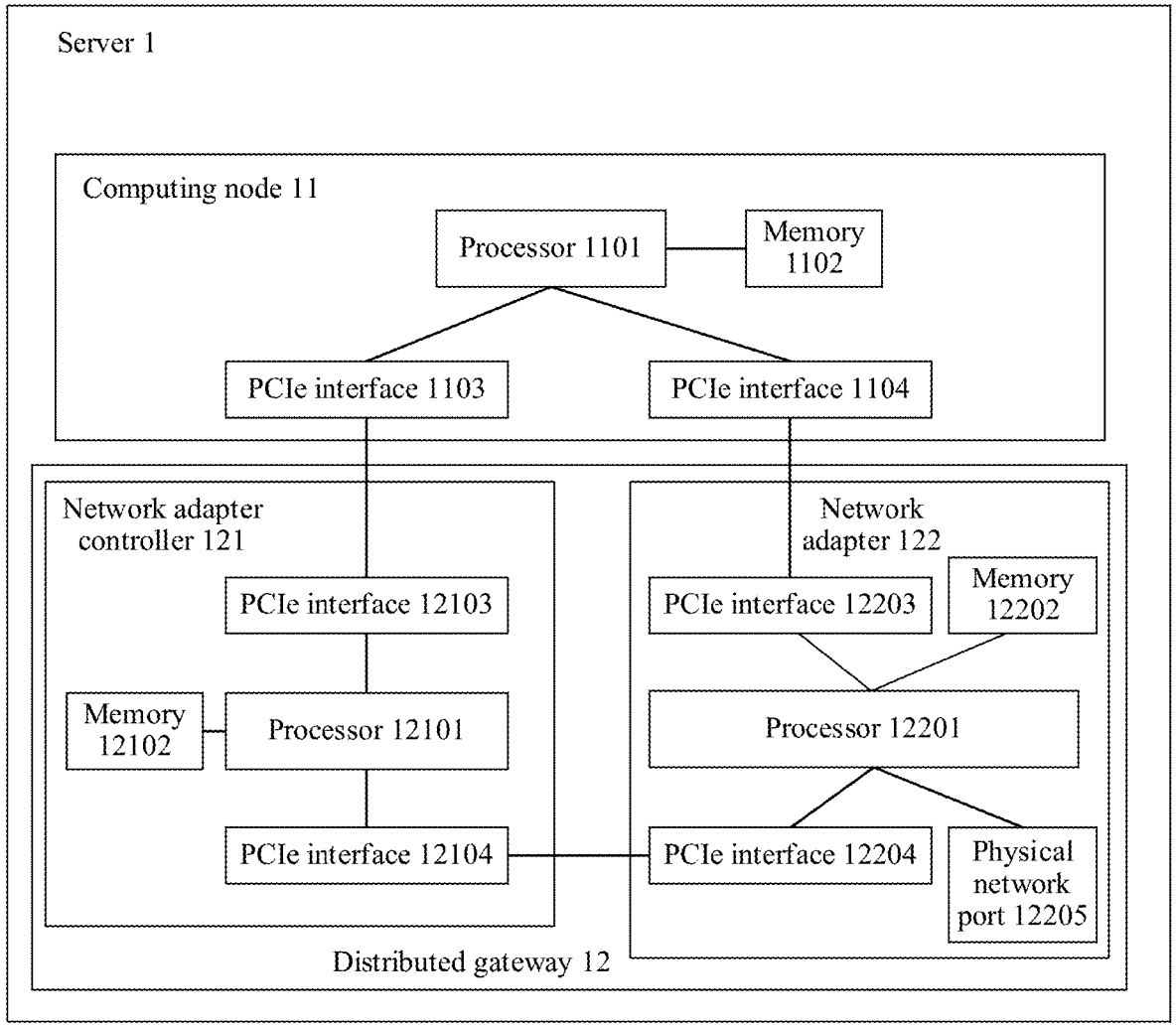
FIG. 7 is a schematic structural diagram of hardware of a server 1 according to an embodiment of the present disclosure.

In some embodiments of the present disclosure, the distributed gateway 12 of a server 1 is implemented by using the network adapter controller 121 and the network adapter 122. The network adapter controller 121, the network adapter 122, and the computing node 11 may be connected to each other by using a PCIe link. For details, refer to FIG. 7. FIG. 7 is a schematic structural diagram of hardware of a server 1 according to an embodiment of the present disclosure.

As shown in FIG. 7, a PCIe interface 1103 of a computing node 11 is connected to a PCIe interface 12103 of a network adapter controller 121, to form a PCIe link. A PCIe interface 1104 of the computing node 11 is connected to a PCIe interface 12203 of a network adapter 122, to form the PCIe link. A PCIe interface 12104 of the network adapter controller 121 is connected to a PCIe interface 12204 of the network adapter 122, to form the PCIe link.

The computing node 11 may supply power to the network adapter controller 121 by using the PCIe interface 1103, and supply power to the network adapter 122 by using the PCIe interface 1104. The network adapter 122 may provide a passthrough function for the computing node 11 by using the PCIe link on which the PCIe interface 12203 is located. The network adapter 122 may further provide the passthrough function by using the PCIe link on which the PCIe interface 12204 is located. A processor 1101 may be one or more processors of an X86 architecture with a powerful computing capability, a processor 12101 may be a processor of an ARM architecture with a relatively strong computing capability, and a processor 12201 may be a processor with a common computing capability.

A distributed gateway 22 also has a similar structure, and details are not described herein.

It should be noted that, in some other examples of the present disclosure, a distributed gateway may also be independently implemented by using a smart network adapter, for example, a physical network port and a switching apparatus are integrated into a network adapter controller, which is not limited in this embodiment of the present disclosure.

Figure 8:
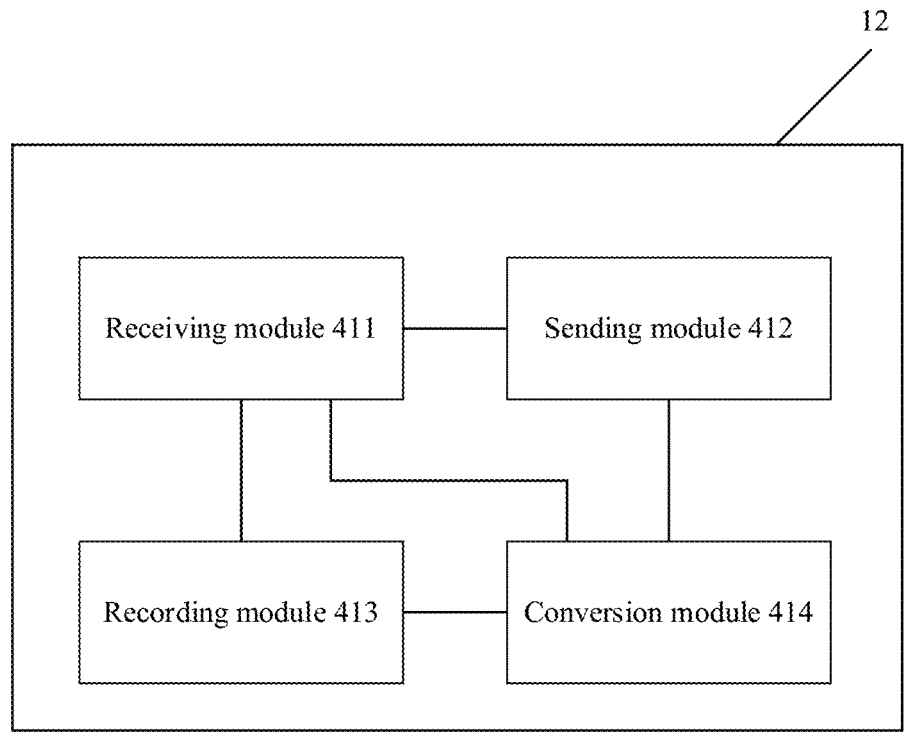
FIG. 8 is a schematic structural diagram of an apparatus of a distributed gateway according to an embodiment of the present disclosure.

Referring to FIG. 8, FIG. 8 is a schematic structural diagram of an apparatus of a distributed gateway according to an embodiment of the present disclosure.

As shown in FIG. 8, the distributed gateway includes:
- a receiving module 411, configured to receive a management packet sent by a cloud management platform, where the management packet carries network information of a second VLAN;
- a recording module 413, configured to record the network information of the second VLAN, where
- the receiving module 411 is further configured to receive a first service packet that carries service data and that is sent by a first virtual machine to a second virtual machine, and the second virtual machine is located in the second VLAN;
- a conversion module 414, configured to modify the first service packet based on the network information of the second VLAN to generate a second service packet that can reach the second VLAN, where the second service packet carries the service data; and
- a sending module 412, configured to send the second service packet to a switch. A function of each functional module is also described in the embodiments shown in FIG. 1 to FIG. 6, and details are not described herein again.

Figure 9:
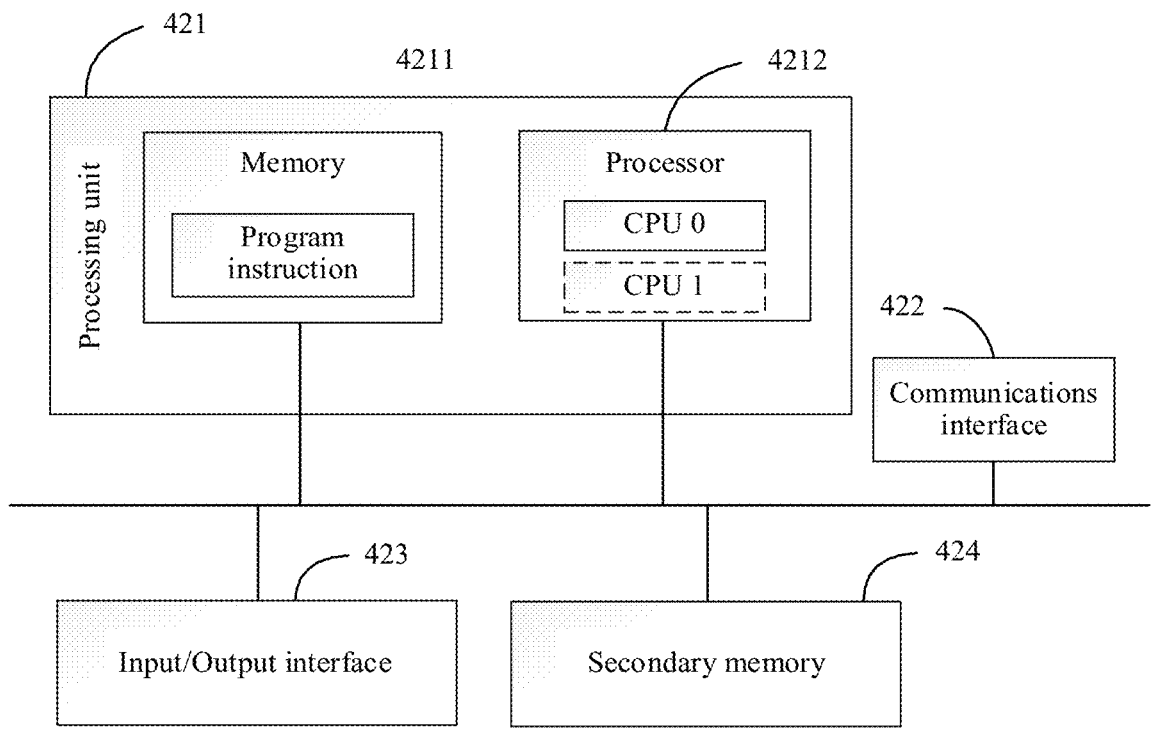
FIG. 9 is another schematic structural diagram of an apparatus of a distributed gateway according to an embodiment of the present disclosure.

Referring to FIG. 9, FIG. 9 is another schematic structural diagram of an apparatus of a distributed gateway according to an embodiment of the present disclosure.

As shown in FIG. 9, the distributed gateway may include a processing unit 421 and a communications interface 422. The processing unit 421 is configured to execute functions defined by an operating system running on a physical server and various software programs. For example, implementing a function of a virtual switch. The communications interface 422 is configured to communicate and interact with another computing node. Another device may be another physical server. The communications interface 422 may be a network adapter. Optionally, the physical server may further include an input/output interface 423. The input/output interface 423 is connected to an input/output device, and the input/output interface 423 is configured to receive input information and output an operation result. The input/output interface 423 may be a mouse, a keyboard, a display, a CD-ROM drive, or the like. Optionally, the physical server may further include a secondary memory 424, which is generally referred to as an external memory. A storage medium of the secondary memory 424 may be a magnetic medium (for example, a floppy disk, a hard disk, or a magnetic tape), an optical medium (for example, an optical disc), a semiconductor medium (for example, a solid-state drive), or the like. The processing unit 421 may have a plurality of implementation forms. For example, the processing unit 421 may include a processor 4212 and a memory 4211. The processor 4212 performs, based on a program instruction stored in the memory 4211, related operations of the distributed gateway 12 or the distributed gateway 22 in the embodiments shown in FIG. 2 to FIG. 4. The processor 4212 may be a central processing unit (CPU) or a graphics processing unit (GPU). The processor 4212 may be a single-core processor or a multi-core processor. The processing unit 421 may also be independently implemented by using a logic device with built-in processing logic, for example, a field programmable gate array (FPGA) or a digital signal processor (DSP).

It may be clearly understood by a person skilled in the art that, for the purpose of convenient and brief description, for a detailed working process of the foregoing system, apparatus, and unit, refer to a corresponding process in the foregoing method embodiments, and details are not described herein again.

Further, in another embodiment of the present disclosure, a container may be used to replace a virtual machine. This is not limited in this embodiment of the present disclosure.

It should be noted that any apparatus embodiment described above is merely exemplary. The units described as separate parts may or may not be physically separate, and parts displayed as units may or may not be physical units, may be located in one position, or may be distributed on a plurality of network units. Some or all of the processes may be selected based on actual requirements to achieve the objectives of the solutions of the embodiments. In addition, in the accompanying drawings of the apparatus embodiments provided by the present disclosure, connection relationships between processes indicate that the modules have communication connections with each other, which may be implemented as one or more communications buses or signal cables. A person of ordinary skill in the art may understand and implement the embodiments of the present disclosure without creative efforts.

Based on the description of the foregoing implementations, the person skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a hardware structure used to achieve a same function may be of various forms, for example, in a form of an analog circuit, a digital circuit, a dedicated circuit, or the like. However, as for the present disclosure, software program implementation is a better implementation in most cases. Based on such an understanding, the technical solutions of the present disclosure essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a host, a network device, and the like) to perform the methods described in the embodiments of the present disclosure.

It may be clearly understood by the person skilled in the art that, for the detailed working process of the foregoing system, apparatus, and unit, refer to the corresponding process in the foregoing method embodiments, and details are not described herein again.

The foregoing descriptions are merely implementations, but are not intended to limit the protection scope of the inventions disclosure herein. Any variation or replacement readily figured out by the person skilled in the art within the technical scope disclosed in the present disclosure shall fall within the protection scope of the claimed inventions. Therefore, the protection scope of the present disclosure shall be subject to the protection scope of the claims.

What is claimed is:

1. A packet processing method for a distributed gateway, wherein the distributed gateway is connected to a first computing node by using a first peripheral component interconnect express (PCIe) link; the distributed gateway is connected to a switch; a first virtual machine is disposed on the first computing node; the first virtual machine is located in a first virtual local area network (VLAN); and the method comprises:
receivin a management packet sent by a cloud management platform, wherein the management packet carries network information of a second VLAN;
recordin the network information of the second VLAN;
receivin a first service packet that carries service data and that is sent by the first virtual machine to a second virtual machine, wherein the second virtual machine is located in the second VLAN;
generating a second service packet to reach the second VLAN based on the first service packet and the network information of the second VLAN, wherein the second service packet carries the service data; and
sending the second service packet to the switch;
wherein the distributed gateway comprises a network adapter controller and a network adapter; the network adapter is provided with a first physical function (PF), a first virtual function (VF), and a physical network port; the network adapter controller is connected to the first PF; the first virtual machine is connected to the first VF; and the physical network port is connected to the switch;

wherein the receiving, by the distributed gateway, a first service packet that carries service data and that is sent by the first virtual machine to a second virtual machine further comprises: receiving, by the network adapter, the first service packet from the first VF;

wherein a destination MAC address of the management packet is a MAC address of the network adapter controller;

the network adapter records a third correspondence between the MAC address of the network adapter controller and the first PF;

the receiving, by the distributed gateway, a management packet sent by the cloud management platform further comprises:

receiving, by the network adapter, the management packet from the physical network port, selecting the first PF from the third correspondence based on the destination MAC address of the management packet, and forwarding the management packet to the first PF; and receiving, by the network adapter controller, the management packet from the first PF.

2. The method according to claim 1, wherein the generating a second service packet based on the first service packet and the network information of the second VLAN to that can reach the second VLAN comprises:

forwarding, by the network adapter, the first service packet to the first PF;

obtaining, by the network adapter controller, the first service packet from the first PF, modifying the first service packet based on the network information of the second VLAN to generate the second service packet, and sending the second service packet to the first PF; and sending, by the network adapter, the second service packet to the physical network port.

3. The method according to claim 1, wherein the recording the network information of the second VLAN comprises: obtaining, by the network adapter controller, the network information of the second VLAN from the management packet, and recording, by the distributed gateway, the network information of the second VLAN.

4. The method according to claim 1, wherein the first service packet is a VLAN packet; a destination address of the first service packet is a MAC address of the second virtual machine; a first VLAN identifier is set for the first VLAN network; a second VLAN identifier different from the first VLAN identifier is set for the second VLAN network; the network information of the second VLAN comprises a first correspondence between the MAC address of the second virtual machine and the second VLAN identifier; and the generating a second service packet based on the first service packet and the network information of the second VLAN to reach the second VLAN comprises:

obtaining, by the distributed gateway, the second VLAN identifier from the first correspondence based on the destination MAC address of the first service packet; and setting, by the distributed gateway, the second VLAN identifier in the first service packet to generate the second service packet.

5. The method according to claim 1, wherein the first service packet is a VLAN packet; a destination MAC address of the first service packet is a MAC address of the second virtual machine; the network information of the second VLAN comprises a second correspondence between the MAC address of the second virtual machine and an IP address of another distributed gateway that is connected to a second computing node by using a second PCIe link; the second virtual machine is disposed on the second computing node; and the generating a second service packet based on the first service packet and the network information of the second VLAN to reach the second VLAN comprises:

obtaining, by the distributed gateway, the IP address from the second correspondence based on the destination address of the first service packet; and encapsulating, by the distributed gateway, the first service packet into the second service packet, wherein the second service packet is an overlay packet, and a destination IP address of the second service packet is the IP address.

6. A distributed gateway, comprising a processor and a memory, wherein the distributed gateway is connected to a computing node on which a first virtual machine is disposed, the distributed gateway is connected to a switch, the first virtual machine is located in a first virtual local area network (VLAN), the memory stores a program instruction, and the program instruction is run by the processor, to that cause the processor to:

receive a management packet sent by a cloud management platform, wherein the management packet carries network information of a second VLAN;

record the network information of the second VLAN;

receive a first service packet that carries service data and that is sent by the first virtual machine to a second virtual machine, wherein the second virtual machine is located in the second VLAN;

modify the first service packet based on the network information of the second VLAN to generate a second service packet to reach the second VLAN, wherein the second service packet carries the service data; and send the second service packet to the switch;

wherein the distributed gateway comprises a network adapter controller and a network adapter; the network adapter is provided with a first physical function (PF), a first virtual function (VF), and a physical network port; the network adapter controller is connected to the first PF; the first virtual machine is connected to the first VF; and the physical network port is connected to the switch;

wherein the program instruction further causes the processor to:

receive the first service packet from the first VF;

wherein a destination MAC address of the management packet is a MAC address of the network adapter controller; the network adapter records a third correspondence between the MAC address of the network adapter controller and the first PF;

wherein the receiving of the management packet sent by the cloud management platform further comprises:

receiving, by the network adapter, the management packet from the physical network port, selecting the first PF from the third correspondence based on the destination MAC address of the management packet, and forward the management packet to the first PF; and receiving, by the network adapter controller, the management packet from the first PF.

7. The distributed gateway according to claim 6, wherein the program instruction further causes the processor to:

forward the first service packet to the first PF;

obtain the first service packet from the first PF, modify the first service packet based on the network information of the second VLAN to generate the second service packet, and send the second service packet to the first PF; and send the second service packet to the physical network port.

8. The distributed gateway according to claim 6, wherein the program instruction further causes the processor to:

obtain the network information of the second VLAN from the management packet, and record the network information of the second VLAN.

9. The distributed gateway according to claim 6, wherein the first service packet is a VLAN packet; a destination address of the first service packet is a MAC address of the second virtual machine; a first VLAN identifier is set for the first VLAN network; a second VLAN identifier different from the first VLAN identifier is set for the second VLAN network; the network information of the second VLAN comprises a first correspondence between the MAC address of the second virtual machine and the second VLAN identifier; and the program instruction further causes the processor to:

obtain the second VLAN identifier from the first correspondence based on the destination MAC address of the first service packet; and set the second VLAN identifier in the first service packet to generate the second service packet.

10. The distributed gateway according to claim 6, wherein the first service packet is a VLAN packet; a destination MAC address of the first service packet is a MAC address of the second virtual machine; the network information of the second VLAN comprises a second correspondence between the MAC address of the second virtual machine and an IP address of another distributed gateway that is connected to a second computing node by using a second PCIe link; the second virtual machine is disposed on the second computing node; and the program instruction further cause the processor to:

obtain the IP address from the second correspondence based on the destination address of the first service packet; and encapsulate the first service packet into the second service packet, wherein the second service packet is an overlay packet, and a destination IP address of the second service packet is the IP address.

* * * * *

UNITED STATES PATENT AND TRADEMARK OFFICE
CERTIFICATE OF CORRECTION

| | |
|---|---|
| PATENT NO. | : 11,831,551 B2 |
| APPLICATION NO. | : 17/358264 |
| DATED | : November 28, 2023 |
| INVENTOR(S) | : Zhengxian Zhang et al. |

It is certified that error appears in the above-identified patent and that said Letters Patent is hereby corrected as shown below:

On the Title Page

In item (73), in Column 1, in "Assignee", Line 3, delete "Distrcit" and insert -- District --.

In the Claims

In Column 20, Line 48, in Claim 1, delete "receivin" and insert -- receiving --.

In Column 20, Line 51, in Claim 1, delete "recordin" and insert -- recording --.

In Column 20, Line 52, in Claim 1, delete "receivin" and insert -- receiving --.

In Column 21, Line 26, in Claim 2, delete "to that can reach the" and insert -- to reach the --.

In Column 22, Line 22, in Claim 6, delete "to that cause the" and insert -- to cause the --.

Signed and Sealed this
First Day of October, 2024

Katherine Kelly Vidal
*Director of the United States Patent and Trademark Office*